UNITED STATES PATENT OFFICE.

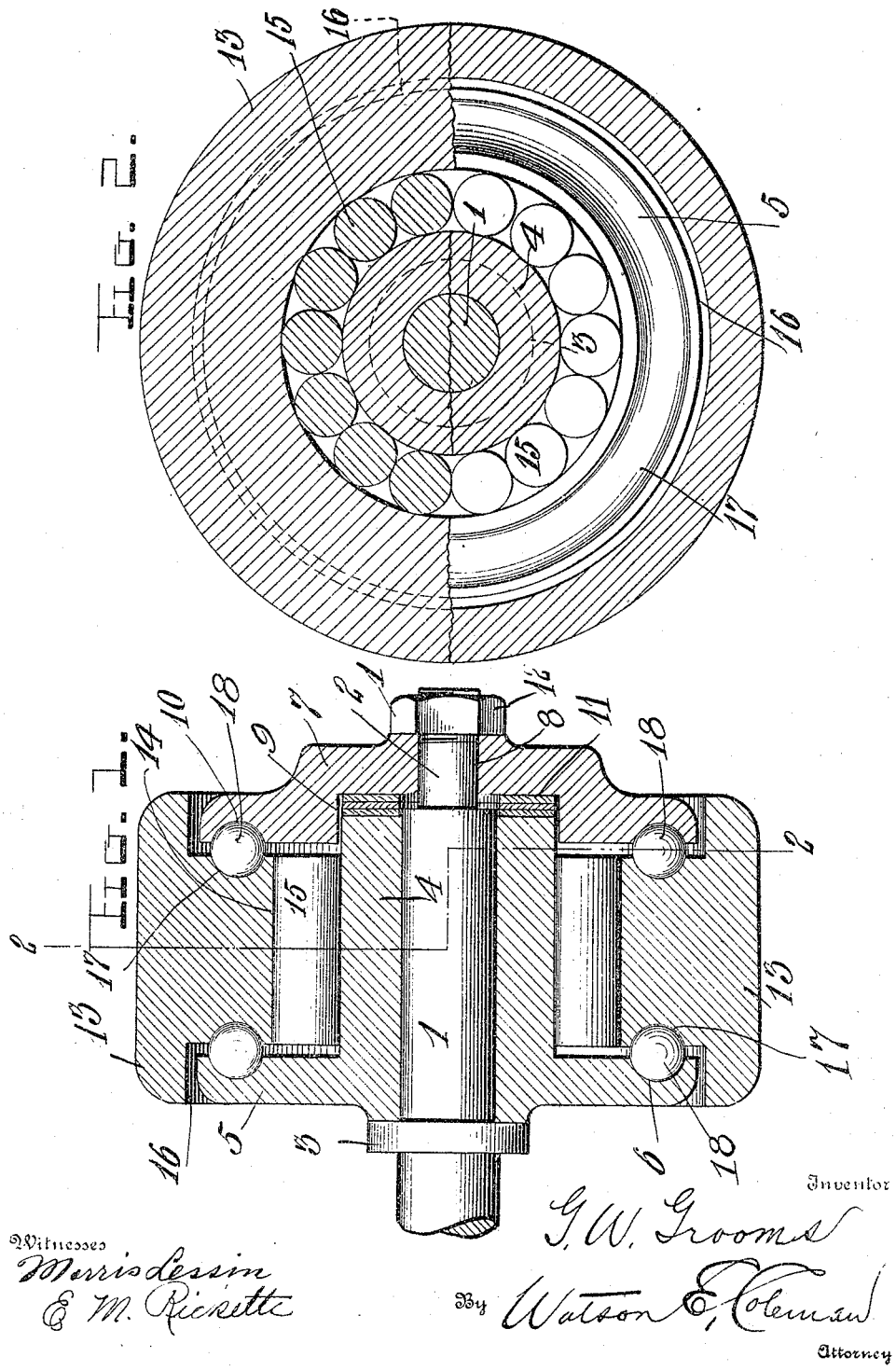

GEORGE W. GROOMS, OF OTTUMWA, IOWA.

WHEEL-HUB.

949,928.  Specification of Letters Patent. Patented Feb. 22, 1910.

Application filed May 6, 1909. Serial No. 494,360.

*To all whom it may concern:*

Be it known that I, GEORGE W. GROOMS, a citizen of the United States, residing at Ottumwa, in the county of Wapello and State of Iowa, have invented certain new and useful Improvements in Wheel-Hubs, of which the following is a specification, reference being had to the accompanying drawings.

This invention relates to improvements in wheel hubs and more particularly anti-friction bearings for the hubs of wheels of all kinds but especially those used on mine and tram cars, railway trucks, farming implements, wheeled vehicles, etc.

The object of the invention is to provide a simple and comparatively inexpensive anti-friction wheel which will be exceedingly strong and durable and the wear upon which may be taken up from time to time so as to cause it to run true and with little or no friction.

With the above and other objects in view, the invention consists in the novel construction and the combination and arrangement of parts hereinafter fully described and claimed, and illustrated in the accompanying drawings, in which—

Figure 1 is a sectional view through the improved wheel hub; and Fig. 2 is a section taken in a plane at right angles to that of Fig. 1, the plane of the section being indicated by the line 2—2 in Fig. 1.

In the drawings 1 denotes an axle having at one of its ends a reduced screw threaded portion 2 and at a suitable distance from said end a shoulder formed by a collar or flange 3.

4 denotes a cylindrical sleeve arranged on the axle 1 and having one end engaged with said stop shoulder 3 and also formed with an annular radially projecting flange 5, in the inner face of which and adjacent to its outer edge is an annular groove or raceway 6.

7 denotes a circular plate or cap having a central opening 8 to receive the reduced end or stem 2 of the axle and also having formed in its inner face concentric with the opening 8 a circular cavity 9 into which the outer end of the sleeve 4 projects. Said cap 7 has also formed in its inner face adjacent its outer edge an annular groove or raceway 10.

11 denotes a plurality of washers arranged in the cavity 9 of the cap 7 to space the latter from the sleeve 4, and 12 denotes a nut engaged with the threaded extremity of the reduced portion or stem 2 of the axle and adapted to clamp the cap 7 and sleeve 4 rigidly upon the axle.

13 denotes a rotary member which forms the hub of the wheel. Said member 13 is annular in form having a central circular opening 14 of greater diameter than the sleeve 4 so that an annular series of anti-friction rollers 15 may be arranged between its central portion and the exterior of the sleeve 4. Said member 13 is also formed in its side faces with circular recesses 16 to receive the flange 5 and cap 7 and in the bottom of each of the recesses 16 is an annular groove or raceway 17. The raceways 17 oppose the raceways 6, 10 in the flange 5 and cap 7 and said opposing raceways are adapted to receive annular series of bearing balls 18.

When the parts are assembled, as shown in Fig. 1, it will be seen that the washers 11 space the cap 7 from the flange 5 so that the anti-friction rollers 15 and bearing balls 18 will support the hub member 13 for rotary movement within the other parts of the wheel. The rollers 15 will permit the wheel to run with little or no friction and the two rows of balls 18 will reduce the side friction or strain. When the parts of the device wear, one or more of the washers 11 may be removed and the cap adjusted inwardly on the axle so as to compensate for such wear.

From the foregoing it will be seen that the invention provides an exceedingly simple and practical bearing for a wheel or roller which may be produced at a small cost and will be exceedingly strong and inexpensive in construction and durable in use. Furthermore, it will be light running or free from friction and wear upon its parts may be quickly taken up.

Having thus described the invention what is claimed is:

The combination of an axle having a stop shoulder and a screw threaded portion, a cylindrical sleeve upon the axle and having its inner end engaged with said shoulder, an annular flange carried by the inner end of the sleeve, a cap arranged on the outer end of the axle and having a cavity to receive the outer end of the sleeve, washers interposed between the bottom of said cavity in the cap and said outer end of the sleeve, a nut upon the projecting threaded end of the axle, a rotary member projecting between the flange and cap and having its opposing sides recessed to receive the same, an annular row rotary member projecting between the central portion of the rotary member and the sleeve, and annular rows of anti-friction bearing balls between the opposite sides of the rotary member and the inner faces of the flange and cap.

In testimony whereof I hereunto affix my signature in the presence of two witnesses.

GEORGE W. GROOMS.

Witnesses:
CLARENCE L. LEE,
RALPH H. McELROY.